United States Patent
Wang et al.

(10) Patent No.: US 11,084,165 B2
(45) Date of Patent: Aug. 10, 2021

(54) AUTOMATIC ALIGNMENT SYSTEM AND METHOD OF ROBOT MANIPULATOR

(71) Applicant: DELTA ELECTRONICS, INC., Taoyuan (TW)

(72) Inventors: Yen-Po Wang, Taoyuan (TW); Cheng-Hao Huang, Taoyuan (TW); Ke-Hao Chang, Taoyuan (TW); Chun-Ying Chen, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 78 days.

(21) Appl. No.: 16/220,984

(22) Filed: Dec. 14, 2018

(65) Prior Publication Data

US 2020/0039062 A1 Feb. 6, 2020

(30) Foreign Application Priority Data

Aug. 3, 2018 (CN) .......................... 201810877002.7

(51) Int. Cl.
*B25J 9/10* (2006.01)
*B25J 9/12* (2006.01)

(52) U.S. Cl.
CPC .............. *B25J 9/1005* (2013.01); *B25J 9/12* (2013.01)

(58) Field of Classification Search
CPC ................................ B25J 9/1005; B25J 9/12
USPC ......................................................... 700/245
See application file for complete search history.

(56) References Cited

U.S. PATENT DOCUMENTS

| 4,562,391 A | * | 12/1985 | Inoue | ........................ B25J 9/046 |
|   |   |   |   | 219/124.1 |
| 4,562,551 A | * | 12/1985 | Inaba | ...................... B25J 9/1602 |
|   |   |   |   | 318/568.13 |
| 5,954,840 A | * | 9/1999 | Genov | ...................... B25J 9/042 |
|   |   |   |   | 414/744.5 |

(Continued)

FOREIGN PATENT DOCUMENTS

| CN | 106802412 A | 6/2017 |
| CN | 206356482 U | 7/2017 |

(Continued)

*Primary Examiner* — Khoi H Tran
*Assistant Examiner* — Rodney P King
(74) *Attorney, Agent, or Firm* — Kirton McConkie; Evan R. Witt

(57) ABSTRACT

An automatic alignment system of a robot manipulator is provided. The automatic alignment system includes a signal transmission module and a controller. The signal transmission module includes a first signal receiving and transmitting element and a second signal receiving and transmitting element. The first signal receiving and transmitting element is mounted on the robot manipulator. The second signal receiving and transmitting element is disposed neighboring to a target workpiece. A signal is transported between the signal receiving and transmitting elements. The controller is electrically connected with the signal transmission module for receiving the signal outputted from the signal transmission module. The controller acquires a relative position between the first signal receiving and transmitting element and the second signal receiving and transmitting element according to a variation in the signal. The controller controls the robot manipulator to be automatically aligned to the target workpiece in accordance with the relative position.

13 Claims, 9 Drawing Sheets

(56) References Cited

U.S. PATENT DOCUMENTS

| | | | | |
|---|---|---|---|---|
| 7,262,861 | B1* | 8/2007 | Pepper | G01B 11/06 |
| | | | | 356/502 |
| 9,457,475 | B2* | 10/2016 | Ivanov | B25J 9/1697 |
| 2010/0121489 | A1* | 5/2010 | Inazumi | G05B 19/402 |
| | | | | 700/255 |
| 2011/0004343 | A1 | 1/2011 | Iida | |
| 2015/0105908 | A1 | 4/2015 | Ivanov et al. | |
| 2015/0166273 | A1* | 6/2015 | Price | H01J 37/20 |
| | | | | 414/225.01 |

FOREIGN PATENT DOCUMENTS

| | | |
|---|---|---|
| CN | 107932018 A | 4/2018 |
| CN | 108161889 A | 6/2018 |
| CN | 207531272 U | 6/2018 |
| TW | 201702034 A | 1/2017 |
| TW | 201800197 A | 1/2018 |

* cited by examiner

AUTOMATIC ALIGNMENT SYSTEM AND METHOD OF ROBOT MANIPULATOR

CROSS-REFERENCE TO RELATED APPLICATION

This application claims priority to China Patent Application No. 201810877002.7, filed on Aug. 3, 2018, the entire content of which is incorporated herein by reference for all purposes.

FIELD OF THE DISCLOSURE

The present disclosure relates to an automatic alignment system and method, and more particularly to an automatic alignment system and method of a robot manipulator.

BACKGROUND OF THE DISCLOSURE

Nowadays, robot manipulators have been extensively used in automated production line. Procedures such as assembling, welding, transportation can be implemented by robot manipulators instead of manpower to reach higher efficiency. During the progress of guiding robot manipulators into the production line, users have to teach robot manipulator the position and the posture and set up the operating procedures of robot manipulator based on the taught position and posture. In order to teach robot manipulator the position and the posture, at first the robot manipulator should be moved to a target location for alignment.

Generally, users control the robot manipulator to move to the target location by using controller or teach pendant. Otherwise, users draw the robot manipulator to the target location with hands. Whether the robot manipulator is located at the target location is confirmed with eyes, and sometimes the external machine is mounted to provide the auxiliary machine vision. However, for the prior alignment method described above, the movement and location of robot manipulator are controlled and confirmed by manpower. Accordingly, large error is easily caused by human factor. Even though the location of robot manipulator is confirmed by the auxiliary machine vision, the robot manipulator is moved through manual operation. Meanwhile, the robot manipulator can't be aligned accurately due to the limited precision of the machine vision. In addition, the prior alignment method can't realize the automatic alignment of robot manipulator.

Therefore, there is a need of providing an automatic alignment system and method of a robot manipulator in order to overcome the above drawbacks.

SUMMARY OF THE DISCLOSURE

An object of the present disclosure provides an automatic alignment system and method of a robot manipulator. Signal receiving and transmitting elements of the automatic alignment system are mounted on the robot manipulator and disposed neighboring to a target workpiece respectively. A controller acquires a relative position between the signal receiving and transmitting elements according to a variation in the signal transported between the signal receiving and transmitting elements. The controller controls the robot manipulator to move to the target location according to the relative position. Therefore, the robot manipulator is automatically aligned to the target workpiece, and the precision and accuracy of alignment are increased. In addition, the controller controls the robot manipulator to move to the target location in accordance with a distribution of the signal in a space. It's unnecessary for the controller to set up the moving path of the robot manipulator by complex calculations. Moreover, the actual type of the signal receiving and transmitting element as a signal transmitter can be adjusted according to the practical requirements, and the applicability is enhanced.

In accordance with an aspect of the present disclosure, there is provided an automatic alignment system of a robot manipulator. The automatic alignment system includes a signal transmission module and a controller. The signal transmission module includes a first signal receiving and transmitting element and a second signal receiving and transmitting element. The first signal receiving and transmitting element is mounted on the robot manipulator. The second signal receiving and transmitting element is disposed neighboring to a target workpiece. A signal is transported between the first signal receiving and transmitting element and the second signal receiving and transmitting element. The controller is electrically connected with the signal transmission module for receiving the signal outputted from the signal transmission module. The controller acquires a relative position between the first signal receiving and transmitting element and the second signal receiving and transmitting element according to a variation in the signal. The controller controls the robot manipulator to be automatically aligned to the target workpiece in accordance with the relative position.

In accordance with another aspect of the present disclosure, there is provided an automatic alignment method of a robot manipulator. The automatic alignment method includes steps of: (a) transporting a signal between a first signal receiving and transmitting element and a second signal receiving and transmitting element of a signal transmission module, wherein the first signal receiving and transmitting element is mounted on the robot manipulator, and the second signal receiving and transmitting element is disposed neighboring to a target workpiece; (b) receiving the signal by a controller, and acquiring a relative position between the first signal receiving and transmitting element and the second signal receiving and transmitting element according to a variation in the signal; and (c) controlling the robot manipulator to be automatically aligned to the target workpiece by the controller in accordance with the relative position.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1A:
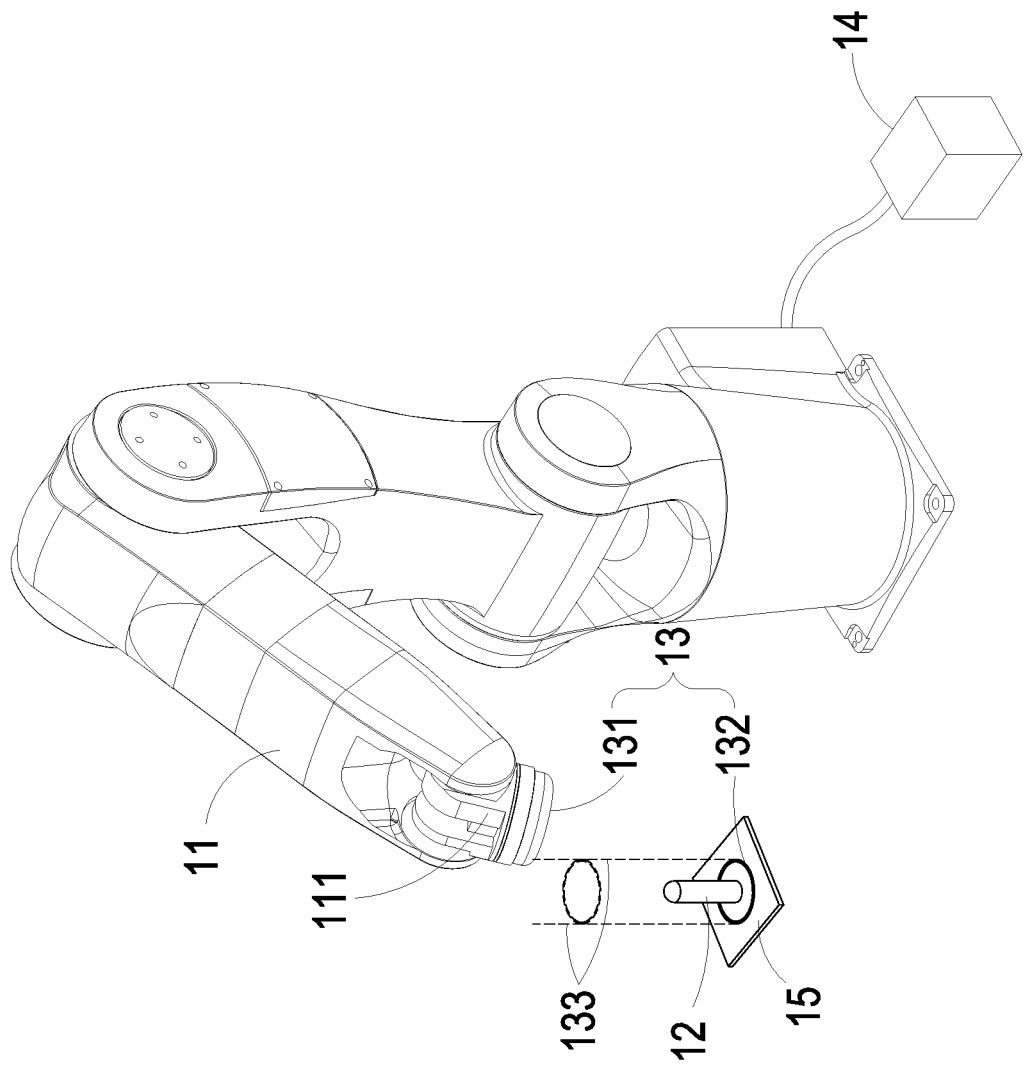
FIG. 1A is a schematic perspective view illustrating an automatic alignment system of a robot manipulator according to an embodiment of the present disclosure.
Figure 1B:
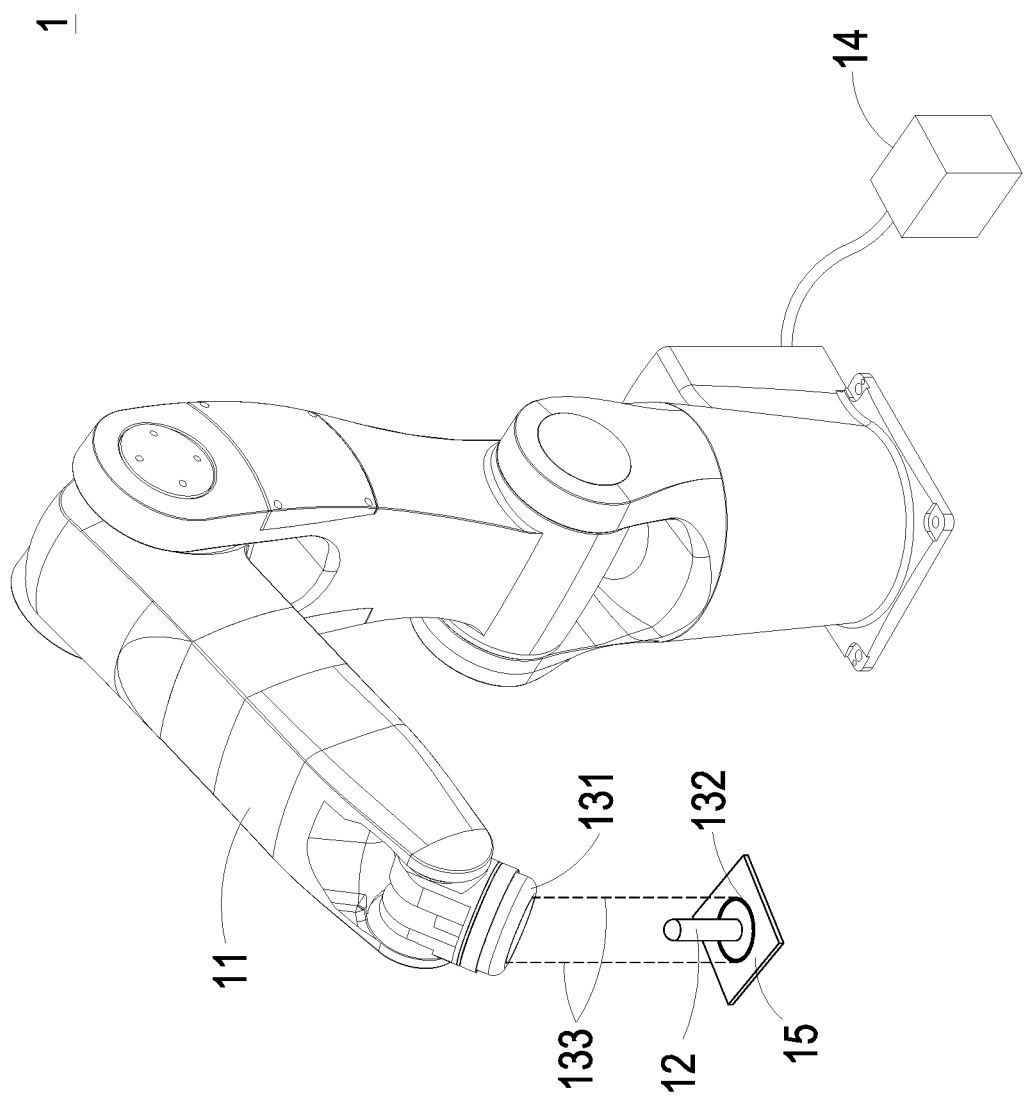
FIG. 1B is a schematic view showing the robot manipulator of FIG. 1A, wherein the robot manipulator is aligned to a target workpiece.

FIG. 1A is a schematic perspective view illustrating an automatic alignment system of a robot manipulator according to an embodiment of the present disclosure, and FIG. 1B is a schematic view showing the robot manipulator of FIG. 1A, wherein the robot manipulator is aligned to a target workpiece. As shown in FIG. 1A, the automatic alignment system 1 includes a robot manipulator 11, a target workpiece 12, a signal transmission module 13 and a controller 14.

The signal transmission module 13 includes a first signal receiving and transmitting element 131 and a second signal receiving and transmitting element 132. The first signal receiving and transmitting element 131 is mounted on the robot manipulator 11. The second signal receiving and transmitting element 132 is disposed neighboring to the target workpiece 12. Signal transportation is performed between the first signal receiving and transmitting element 131 and the second signal receiving and transmitting element 132. The signal transmission module 13 outputs a signal 133 transported between the first signal receiving and transmitting element 131 and the second signal receiving and transmitting element 132. The signal 133 is generated by the first signal receiving and transmitting element 131 or the second signal receiving and transmitting element 132, and the signal 133 is outputted to the controller 14 by the second signal receiving and transmitting element 132 or the first signal receiving and transmitting element 131 accordingly. In an embodiment, the robot manipulator 11 includes a shaft end 111, and the first signal receiving and transmitting element 131 is mounted on the shaft end 111. In an embodiment, preferably but not exclusively, the target workpiece 12 and the second signal receiving and transmitting element 132 is disposed on a working platform 15.

The controller 14 is electrically connected with the robot manipulator 11 and the signal transmission module 13 and receives the signal 133 outputted from the signal transmission module 13. The controller 14 acquires a relative position between the first signal receiving and transmitting element 131 and the second signal receiving and transmitting element 132 according to a variation in the signal 133. Since the first signal receiving and transmitting element 131 and the second signal receiving and transmitting element 132 are mounted on the robot manipulator 11 and disposed neighboring to the target workpiece 12 respectively, the controller 14 can compute the positional relation between the robot manipulator 11 and the target workpiece 12 based on the relative position between the first signal receiving and transmitting element 131 and the second signal receiving and transmitting element 132. Therefore, the controller 14 controls the robot manipulator 11 to move to the target location according to the relative position. As shown in FIG. 1B, the robot manipulator 11 is automatically aligned to the target workpiece 12.

In an embodiment, during the process of the controller 14 controlling the robot manipulator 11 to move to the target location, the signal transportation is performed between the first signal receiving and transmitting element 131 and the second signal receiving and transmitting element 132 continuously. The signal transmission module 13 outputs the signal 133 continuously. Thus, the controller 14 acquires the real-time relative position between the first signal receiving and transmitting element 131 and the second signal receiving and transmitting element 132 continuously in accordance with the signal 133 outputted from the signal transmission module 13. Simultaneously, the controller 14 obtains a variation in the relative position between the first signal receiving and transmitting element 131 and the second signal receiving and transmitting element 132. Therefore, the precision and accuracy of the controller 14 controlling the robot manipulator 11 to move are increased, and the robot manipulator 11 is accurately aligned to the target workpiece 12. In addition, during the process of the controller 14 controlling the robot manipulator 11 to move to the target location, the first signal receiving and transmitting element 131 is moved in accordance with a distribution of the signal 133 in a space. Namely, the moving path of the robot manipulator 11 is corresponding to the distribution of the signal 133 in the space. Consequently, the controller 14 controls the robot manipulator 11 to move in accordance with the distribution of the signal 133 in the space, and the robot manipulator 11 is moved to the target location and is aligned to the target workpiece 12. It's unnecessary for the controller 14 to set up the moving path of the robot manipulator 11 by complex calculations, and the applicability is enhanced.

Figure 2A:
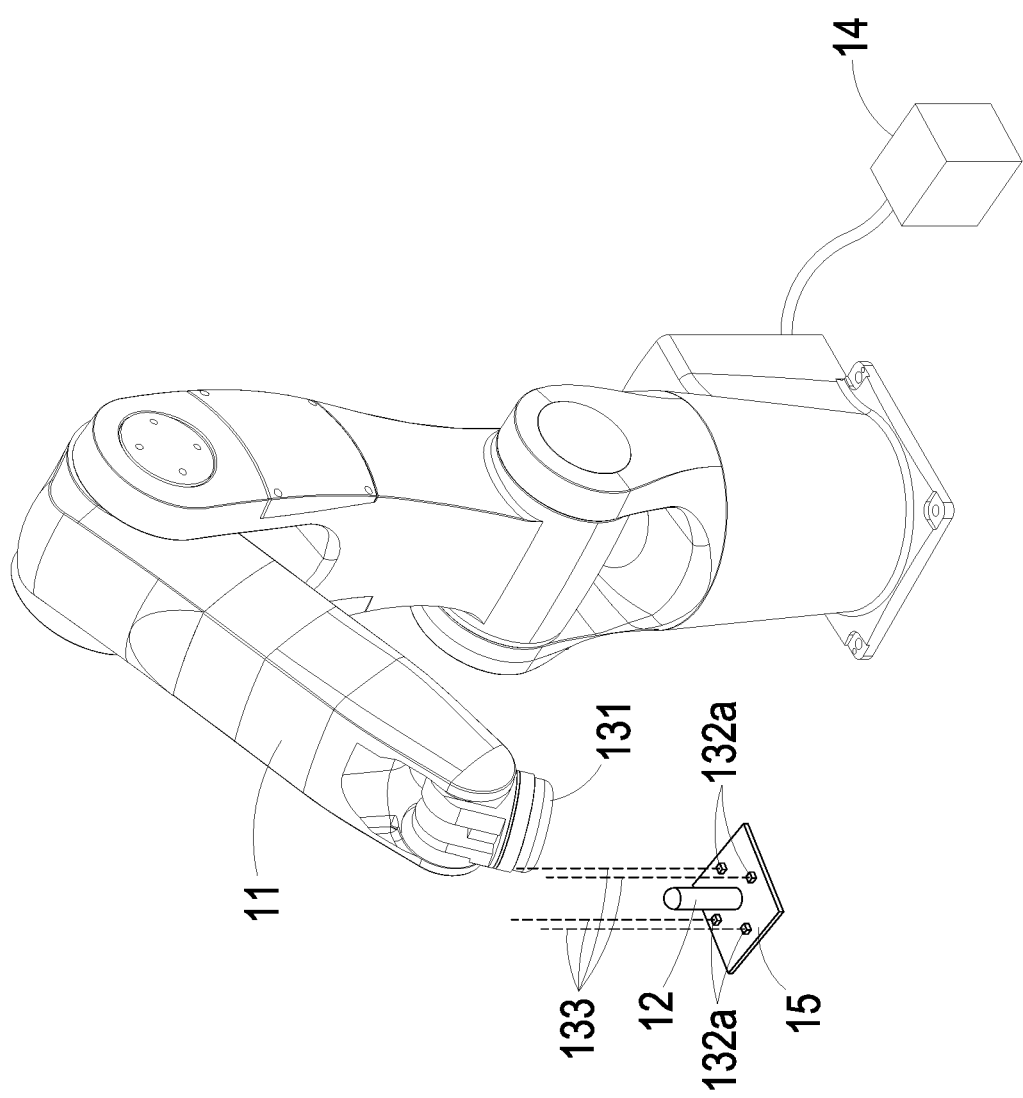
FIG. 2A is a schematic perspective view illustrating a variant example of the automatic alignment system of the robot manipulator of FIG. 1A.
Figure 2B:
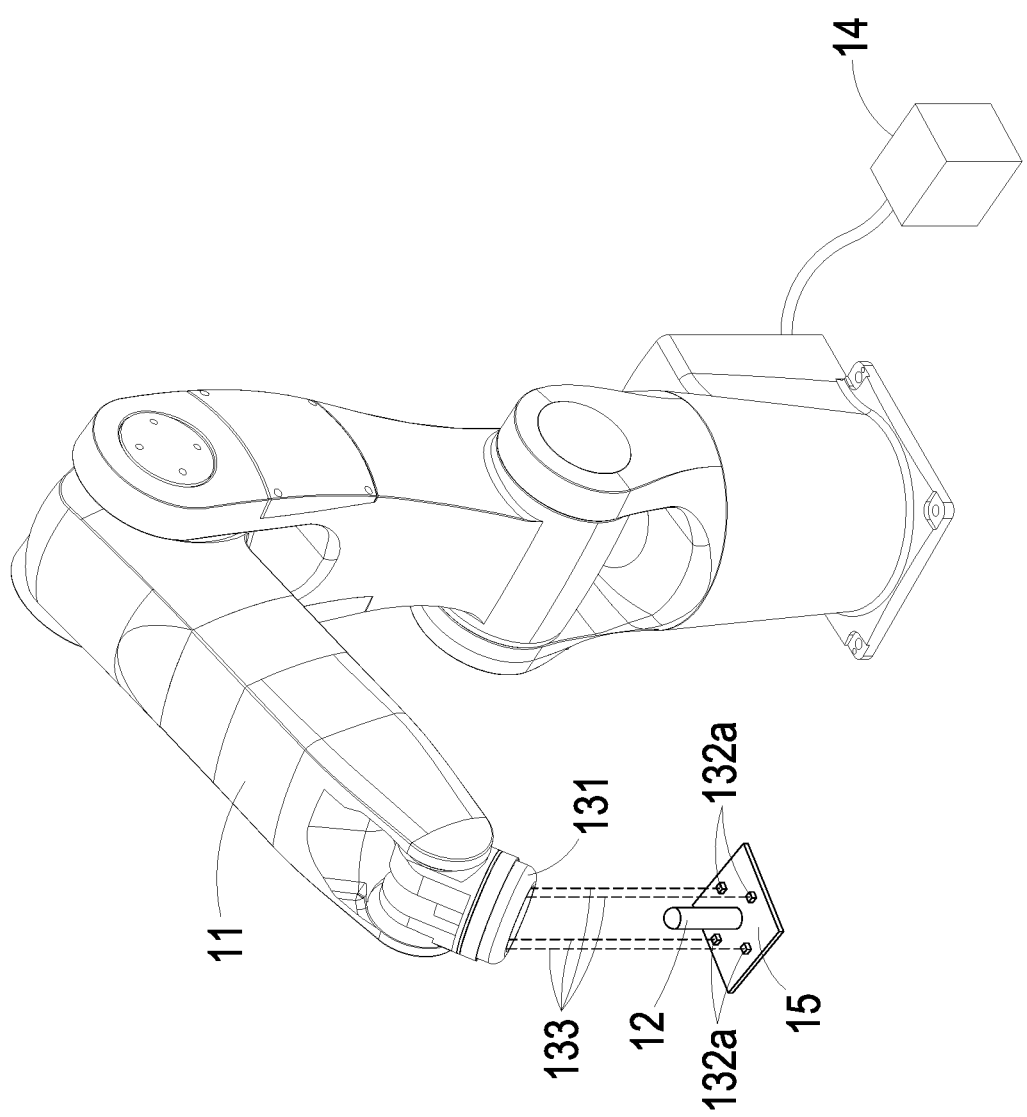
FIG. 2B is schematic view showing the robot manipulator of FIG. 2A, wherein the robot manipulator is aligned to the target workpiece.
Figure 3A:
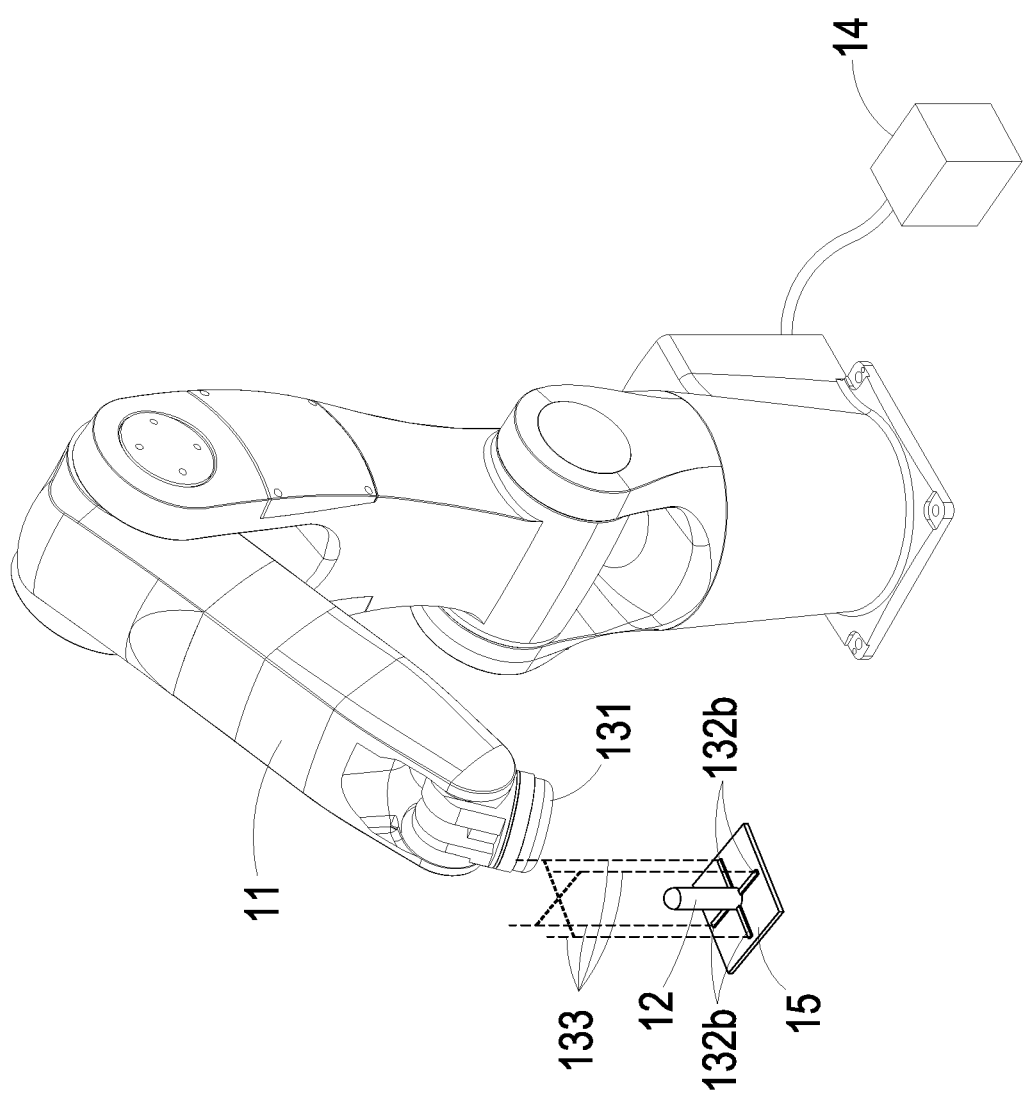
FIG. 3A is a schematic perspective view illustrating another variant example of the automatic alignment system of the robot manipulator of FIG. 1A.
Figure 3B:
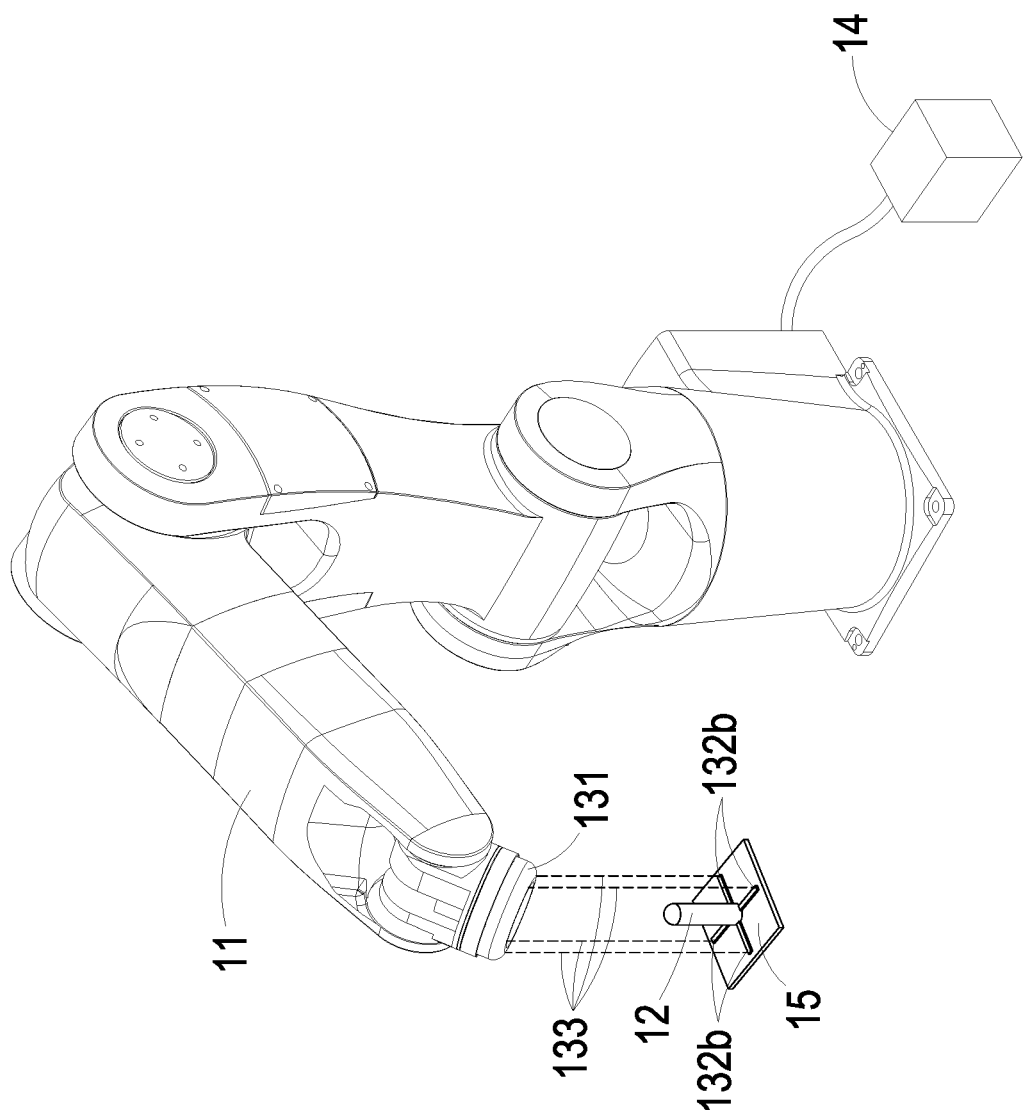
FIG. 3B is schematic view showing the robot manipulator of FIG. 3A, wherein the robot manipulator is aligned to the target workpiece.

Please refer to FIGS. 1A, 1B, 2A, 2B, 3A and 3B. FIG. 2A is a schematic perspective view illustrating a variant example of the automatic alignment system of the robot manipulator of FIG. 1A. FIG. 2B is schematic view showing the robot manipulator of FIG. 2A, wherein the robot manipulator is aligned to the target workpiece. FIG. 3A is a schematic perspective view illustrating another variant example of the automatic alignment system of the robot manipulator of FIG. 1A. FIG. 3B is schematic view showing the robot manipulator of FIG. 3A, wherein the robot manipulator is aligned to the target workpiece. In these embodiments, the first signal receiving and transmitting element 131 is a signal receiver, and the second signal receiving and transmitting element (132, 132a, 132b) is a signal transmitter. The controller 14 is electrically connected with the first signal receiving and transmitting element 131 of the signal transmission module 13. The second signal receiving and transmitting element (132, 132a, 132b) is configured to transmit the signal 133. The first signal receiving and transmitting element 131 is configured to receive the signal 133 transmitted by the second signal receiving and transmitting element (132, 132a, 132b) and output the received signal 133 to the controller 14.

There are various possible types of the second signal receiving and transmitting element. In an embodiment, as shown in FIGS. 1A and 1B, the second signal receiving and transmitting element 132 is a ring-type signal transmitter surrounding the target workpiece. In another embodiment, the second signal receiving and transmitting element is a plurality of point-type signal transmitters, and the connection lines of the a plurality of point-type signal transmitters form a closed polygon. As shown in FIGS. 2A and 2B, the second signal receiving and transmitting element 132a is four point-type signal transmitters, and the connection lines of them forms a quadrangle. In another embodiment, the second signal receiving and transmitting element are a plurality of line-type signal transmitters intersecting at the target workpiece. As shown in FIGS. 3A and 3B, the second signal receiving and transmitting element 132b are two line-type signal transmitters intersecting at the target workpiece. Of course, the various types of the second signal receiving and transmitting element (132, 132a, 132b) are described as examples. The possible types of the second signal receiving and transmitting element are not limited thereto. In addition, as the actual type of the second signal receiving and transmitting element (132, 132a, 132b) changes, the distribution of the signal 133 in the space changes. Accordingly, the moving path of the robot manipulator 11 moving to the target location is changed. Consequently, the actual type of the second signal receiving and transmitting element 132 can be adjusted according to the practical requirements, and the moving path of the robot manipulator 11 is adjusted correspondingly. The applicability is enhanced.

Figure 4A:
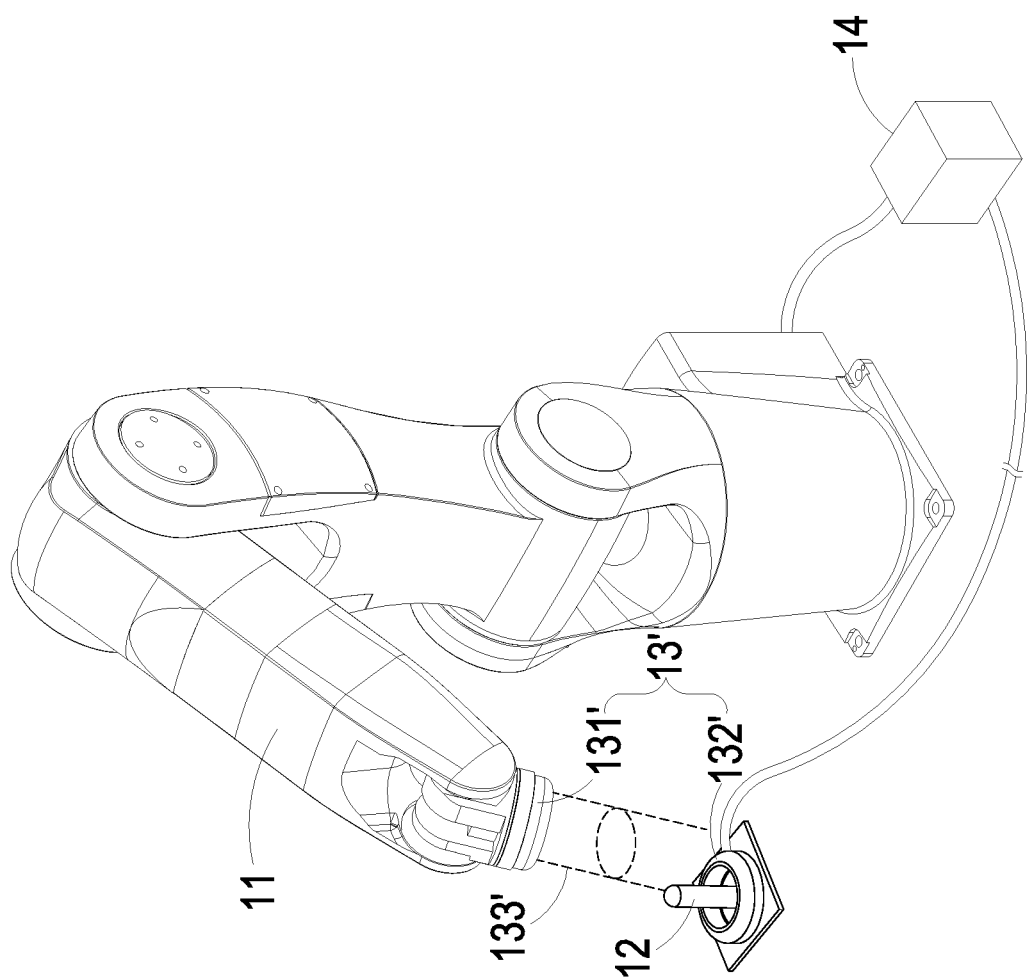
FIG. 4A is a schematic perspective view illustrating an automatic alignment system of a robot manipulator according to another embodiment of the present disclosure.
Figure 4B:
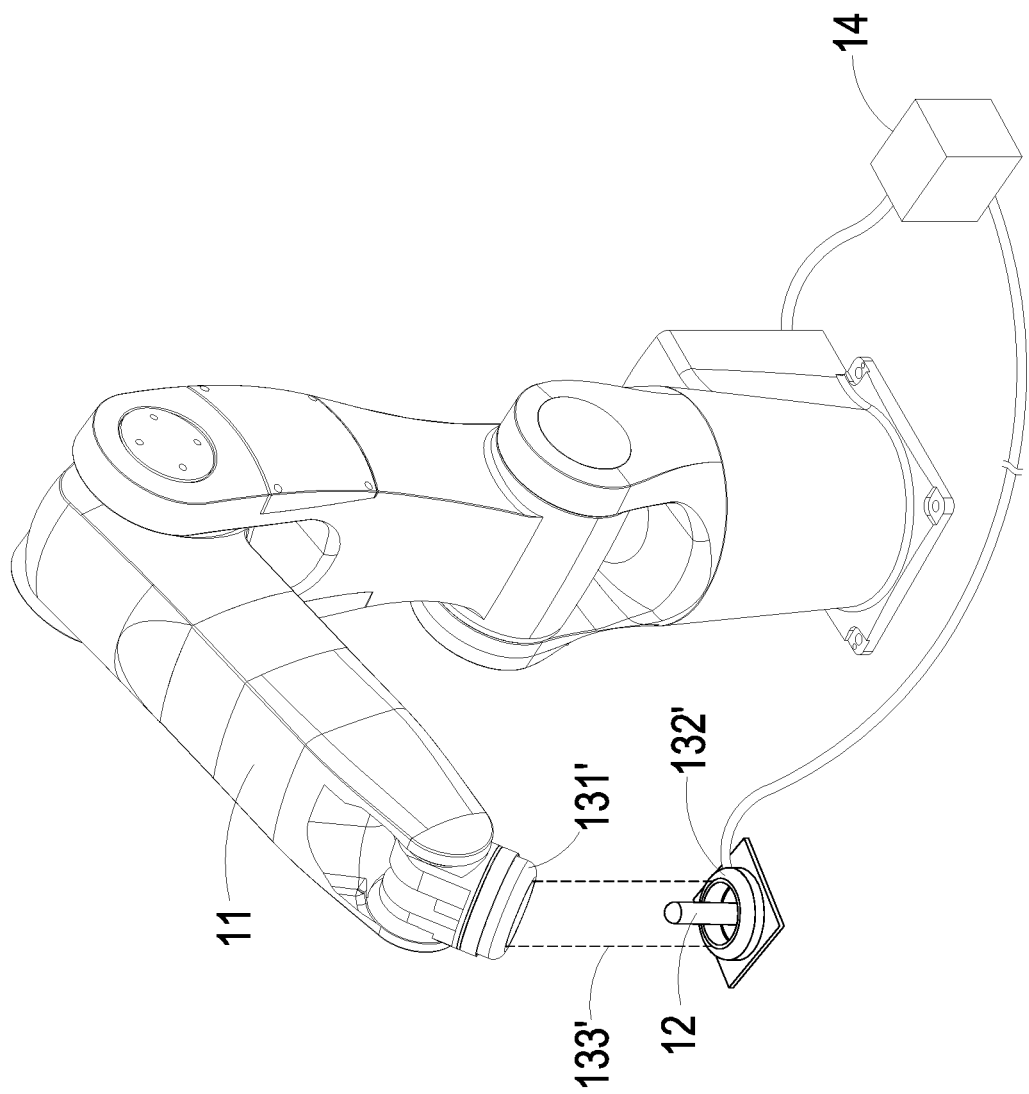
FIG. 4B is schematic view showing the robot manipulator of FIG. 4A, wherein the robot manipulator is aligned to the target workpiece.

FIG. 4A is a schematic perspective view illustrating an automatic alignment system of a robot manipulator according to another embodiment of the present disclosure, and FIG. 4B is schematic view showing the robot manipulator of FIG. 4A, wherein the robot manipulator is aligned to the target workpiece. Component parts and elements corresponding to those shown in FIGS. 1A and 1B are designated by identical numeral references, and detailed descriptions thereof are omitted. In this embodiment, the automatic alignment system 1' includes a robot manipulator 11, a target workpiece 12, a signal transmission module 13' and a controller 14. A first signal receiving and transmitting element 131' and a second signal receiving and transmitting element 132' of the signal transmission module 13' are mounted on the robot manipulator 11 and disposed neighboring to the target workpiece 12 respectively. The first signal receiving and transmitting element 131' is a signal transmitter, and the second signal receiving and transmitting element 132' is a signal receiver. The controller 14 is electrically connected with the second signal receiving and transmitting element 132'. The first signal receiving and transmitting element 131' is configured to transmit a signal 133'. The second signal receiving and transmitting element 132' is configured to receive the signal 133' transmitted by the first signal receiving and transmitting element 131' and output the received signal 133' to the controller 14. The controller 14 acquires a relative position between the first signal receiving and transmitting element 131' and the second signal receiving and transmitting element 132' according to a variation in the signal 133'. Consequently, the controller 14 controls the robot manipulator 11 to move to the target location in accordance with the relative position, and thus the robot manipulator 11 is automatically aligned to the target workpiece 12. In an embodiment, the first signal receiving and transmitting element 131' is for example but limited to a ring-type signal transmitter.

Figure 5:
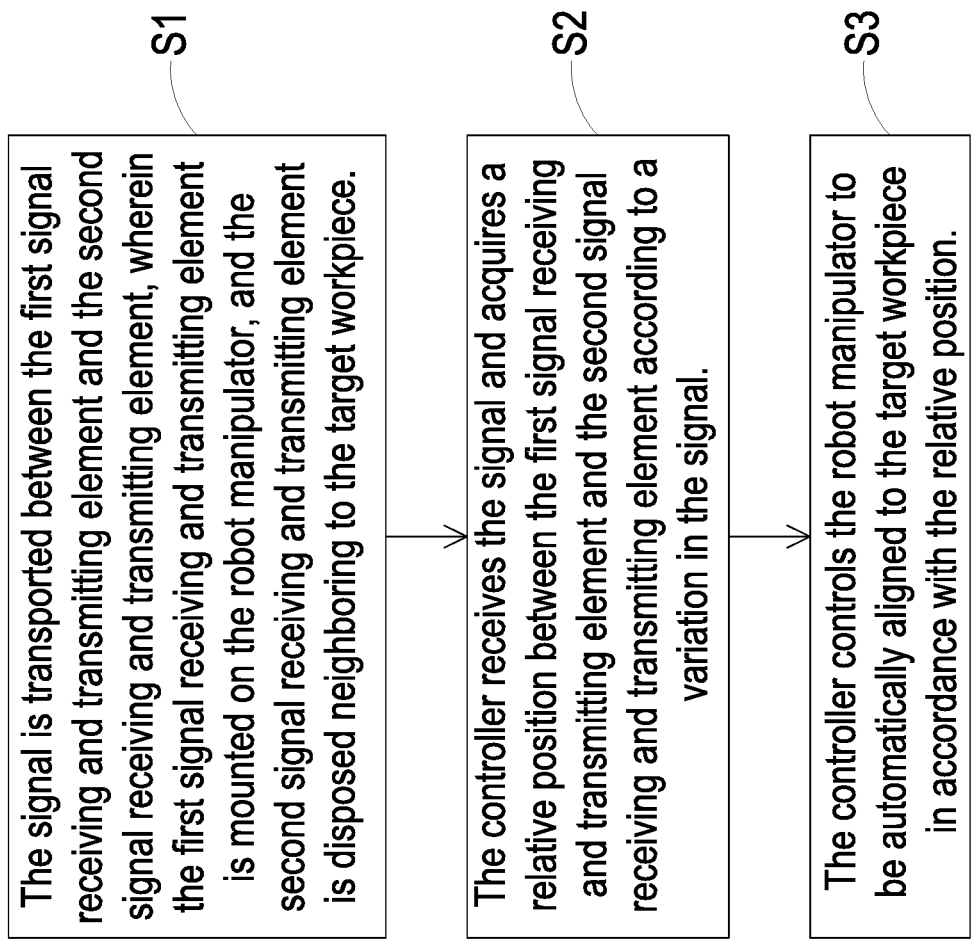
FIG. 5 is a flowchart illustrating an automatic alignment method of a robot manipulator according to an embodiment of the present disclosure.

FIG. 5 is a flowchart illustrating an automatic alignment method of a robot manipulator according to an embodiment of the present disclosure. The automatic alignment method is applied to the automatic alignment system (1, 1') of FIGS. 1A and 4A. The automatic alignment method includes the following steps.

Firstly, the signal (133, 133') is transported between the first signal receiving and transmitting element (131, 131') and the second signal receiving and transmitting element (132, 132'), wherein the first signal receiving and transmitting element (131, 131') is mounted on the robot manipulator 11, and the second signal receiving and transmitting element (132, 132') is disposed neighboring to the target workpiece 12 (Step S1).

Then, the controller 14 receives the signal (133, 133') and acquires a relative position between the first signal receiving and transmitting element (131, 131') and the second signal receiving and transmitting element (132, 132') according to a variation in the signal (133, 133') (Step S2).

Finally, the controller 14 controls the robot manipulator 11 to be automatically aligned to the target workpiece 12 in accordance with the relative position (Step S3). In an embodiment, in accordance with the relative position, the controller 14 controls the robot manipulator 11 to move to the target location along the distribution of the signal (133, 133') in the space. The moving path of the robot manipulator 11 is corresponding to the distribution of the signal (133, 133') in the space.

In an embodiment, as shown in FIG. 1A, the first signal receiving and transmitting element 131 is a signal receiver, and the second signal receiving and transmitting element 132 is a signal transmitter. The controller 14 is electrically connected with the first signal receiving and transmitting element 131. Under this circumstance, in Step S1, the signal 133 is transmitted by the second signal receiving and transmitting element 132, and the signal 133 is received and outputted by the first signal receiving and transmitting element 131. In Step S2, the signal 133 outputted from the first signal receiving and transmitting element 131 is received by the controller 14. On the contrary, in another embodiment, as shown in FIG. 4A, the first signal receiving and transmitting element 131' is a signal transmitter, and the second signal receiving and transmitting element 132' is a signal receiver. The controller 14 is electrically connected with the second signal receiving and transmitting element 132'. Under this circumstance, in Step S1, the signal 133 is transmitted by the first signal receiving and transmitting element 131', and the signal 133 is received and outputted by the second signal receiving and transmitting element 132'. In Step S2, the signal 133 outputted from the second signal receiving and transmitting element 132' is received by the controller 14.

From the above descriptions, the present disclosure provides an automatic alignment system and method of a robot manipulator. Signal receiving and transmitting elements of the automatic alignment system are mounted on the robot manipulator and disposed neighboring to the target workpiece respectively. The controller acquires the relative position between the signal receiving and transmitting elements according to a variation in the signal transported between the signal receiving and transmitting elements. The controller controls the robot manipulator to move to the target location according to the relative position. Therefore, the robot manipulator is automatically aligned to the target workpiece, and the precision and accuracy of alignment are increased. In addition, the controller controls the robot manipulator to move to the target location in accordance with a distribution of the signal in a space. It's unnecessary for the controller to set up the moving path of the robot manipulator by complex calculations. Moreover, the actual type of the signal receiving and transmitting element as a signal transmitter can be adjusted according to the practical requirements, and the applicability is enhanced.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An automatic alignment system of a robot manipulator, comprising:
    a signal transmission module comprising a first signal receiving and transmitting element and a second signal receiving and transmitting element, wherein the first signal receiving and transmitting element is mounted on the robot manipulator, the second signal receiving and transmitting element is disposed neighboring to a target workpiece, wherein the second signal receiving and transmitting element is configured to output a signal to the first signal receiving and transmitting element; and
    a controller electrically connected with the first and second signal receiving and transmitting elements, wherein the controller is configured to receive the signal outputted by the second signal receiving and transmitting element, wherein the controller acquires a relative position between the first signal receiving and transmitting element and the second signal receiving and transmitting element according to a variation in the signal, and the controller controls the robot manipulator to move to a target location along a distribution of the signal in a space and to be automatically aligned to the target workpiece in accordance with the relative position.

2. The automatic alignment system according to claim 1, wherein the first signal receiving and transmitting element having at least a signal receiver, the second signal receiving and transmitting element is at least one signal transmitter, the controller is electrically connected with the first signal receiving and transmitting element, the second signal receiving and transmitting element is configured to transmit the signal, and the first signal receiving and transmitting element is configured to receive the signal and output the signal to the controller.

3. The automatic alignment system according to claim 2, wherein the second signal receiving and transmitting element having at least a ring-type signal transmitter surrounding the target workpiece, a plurality of point-type signal transmitters, whose connection lines forms a closed polygon, or a plurality of line-type signal transmitters intersecting at the target workpiece.

4. The automatic alignment system according to claim 1, wherein the first signal receiving and transmitting element is at least one signal transmitter, the second signal receiving and transmitting element having at least a signal receiver, the controller is electrically connected with the second signal receiving and transmitting element, the first signal receiving and transmitting element is configured to transmit the signal, and the second signal receiving and transmitting element is configured to receive the signal and output the signal to the controller.

5. The automatic alignment system according to claim 4, wherein the first signal receiving and transmitting element having at least a ring-type signal transmitter.

6. The automatic alignment system according to claim 1, wherein the robot manipulator comprises a shaft end, and the first signal receiving and transmitting element is mounted on the shaft end.

7. The automatic alignment system according to claim 1, wherein the target workpiece and the second signal receiving and transmitting element are disposed on a working platform.

8. An automatic alignment method of a robot manipulator, comprising steps of:
    (a) transporting a signal between a first signal receiving and transmitting element and a second signal receiving and transmitting element of a signal transmission module, wherein the first signal receiving and transmitting element is mounted on the robot manipulator, and the second signal receiving and transmitting element is disposed neighboring to a target workpiece;
    (b) receiving the signal and acquiring a relative position between the first signal receiving and transmitting element and the second signal receiving and transmitting element according to a variation in the signal by a controller; and
    (c) controlling the robot manipulator to move to a target location along a distribution of the signal in a space and to be automatically aligned to the target workpiece in accordance with the relative position by the controller.

9. The automatic alignment method according to claim 8, wherein the first signal receiving and transmitting element having at least a signal receiver, the second signal receiving and transmitting element is at least one signal transmitter, the controller is electrically connected with the first signal receiving and transmitting element, in the step (a), the signal is transmitted by the second signal receiving and transmitting element, and the signal is received and outputted by the first signal receiving and transmitting element, in the step (b), the signal outputted by the first signal receiving and transmitting element is received by the controller.

10. The automatic alignment method according to claim 9, wherein the second signal receiving and transmitting element having at least a ring-type signal transmitter surrounding the target workpiece, a plurality of point-type signal transmitters, whose connection lines forms a closed polygon, or a plurality of line-type signal transmitters intersecting at the target workpiece.

11. The automatic alignment method according to claim 8, wherein the first signal receiving and transmitting element is at least one signal transmitter, the second signal receiving and transmitting element having at least a signal receiver, the controller is electrically connected with the second signal receiving and transmitting element, in the step (a), the signal is transmitted by the first signal receiving and transmitting element, and the signal is received and outputted by the second signal receiving and transmitting element, in the step (b), the signal outputted by the second signal receiving and transmitting element is received by the controller.

12. The automatic alignment method according to claim 11, wherein the first signal receiving and transmitting element having at least a ring-type signal transmitter.

13. An automatic alignment system of a robot manipulator, comprising:
    a signal transmission module comprising a first signal receiving and transmitting element and a second signal receiving and transmitting element, wherein the first signal receiving and transmitting element is mounted on the robot manipulator, the second signal receiving and transmitting element is disposed neighboring to a target workpiece, wherein the first signal receiving and transmitting element is configured to output a signal to the second signal receiving and transmitting element; and a controller electrically connected with the first and second signal receiving and transmitting elements, wherein the controller is configured to receive the signal outputted by the first signal receiving and transmitting element, wherein the controller acquires a relative position between the first signal receiving and transmitting element and the second signal receiving and transmitting element according to a variation in the signal, and the controller controls the robot manipulator to move to a target location along a distribution of the signal in a space and to be automatically aligned to the target workpiece in accordance with the relative position.

* * * * *